(12) United States Patent
Kraft et al.

(10) Patent No.: US 8,559,928 B2
(45) Date of Patent: Oct. 15, 2013

(54) MOBILE COMMUNICATION TERMINAL, METHOD, AND COMPUTER PROGRAM PRODUCT

(75) Inventors: Christian Kraft, Frederiksberg (DK); Peter Dam Nielsen, Lyngby (DK)

(73) Assignee: Nokia Corporation, Espoo (FI)

( * ) Notice: Subject to any disclaimer, the term of this patent is extended or adjusted under 35 U.S.C. 154(b) by 1407 days.

(21) Appl. No.: 11/170,730

(22) Filed: Jun. 29, 2005

(65) Prior Publication Data
US 2007/0004390 A1 Jan. 4, 2007

(51) Int. Cl.
*H04M 1/725* (2006.01)

(52) U.S. Cl.
USPC ............... 455/412.1; 455/414.1; 455/556.2; 455/566; 379/88.19

(58) Field of Classification Search
USPC .......... 455/412.1, 412.2, 414.1, 556.1, 556.2, 455/557, 566, 466; 379/67.1, 88.12, 88.13, 379/88.17, 93.17, 93.23
See application file for complete search history.

(56) References Cited

U.S. PATENT DOCUMENTS

| | | | |
|---|---|---|---|
| 6,084,951 A * | 7/2000 | Smith et al. | 379/93.17 |
| 6,442,263 B1 * | 8/2002 | Beaton et al. | 379/142.04 |
| 2002/0039915 A1 * | 4/2002 | Hama et al. | 455/566 |
| 2002/0123368 A1 * | 9/2002 | Yamadera et al. | 455/556 |
| 2004/0085360 A1 * | 5/2004 | Pratt et al. | 345/773 |
| 2004/0214609 A1 * | 10/2004 | Sagi et al. | 455/566 |
| 2005/0003870 A1 * | 1/2005 | Nakano et al. | 455/575.1 |
| 2005/0009571 A1 * | 1/2005 | Chiam et al. | 455/566 |
| 2005/0136953 A1 * | 6/2005 | Jo et al. | 455/466 |
| 2006/0252442 A1 * | 11/2006 | Nurmi | 455/518 |

OTHER PUBLICATIONS

User's Guide Nokia 8310, 9360316, Issue 2, Nokia Corporation, 2001, pp. 1-105.

* cited by examiner

*Primary Examiner* — Jean Gelin
(74) *Attorney, Agent, or Firm* — Alston & Bird LLP

(57) ABSTRACT

A mobile communication apparatus, and a computer program product, comprising a memory arranged to hold contact information, wherein items of said contact information are arranged in a tree structure comprising a plurality of logical levels is disclosed. Methods for storing and accessing contact information arranged in this way are also disclosed.

25 Claims, 5 Drawing Sheets

MOBILE COMMUNICATION TERMINAL, METHOD, AND COMPUTER PROGRAM PRODUCT

TECHNICAL FIELD

The present invention relates to a mobile communication apparatus, methods therefore, and a computer program product. The invention particularly relates to a tree structure of contact information.

BACKGROUND OF THE INVENTION

Managing contact information in a mobile communication apparatus has, as other operations performed with small handheld devices, its constraints due to limitations in display size and input means. Normally, contact information is structured as a simple list comprising names, and to each name one or more telephone numbers can be stored, and in some cases also other information. A user of the mobile communication apparatus often experience both saving and accessing contact information as a limitation of the usefulness of the phone book of the mobile communication apparatus. Therefore there is a need for improvements of handling contact information from a mobile communication apparatus.

SUMMARY OF THE INVENTION

In view of the above, an objective of the invention is to solve or at least reduce the problems discussed above. In particular, an objective is to provide contact information storage and/or access in a way that is intuitive to a user. The present invention is based on the understanding that structuring contact information according to relations experienced by a user will provide an intuitive contact management, and thus improved storing of and access to contact information.

According to a first aspect of the present invention, there is provided a mobile communication apparatus comprising a memory arranged to hold contact information, wherein items of said contact information are arranged in a tree structure comprising a plurality of logical levels.

An advantage of this is more feasible access and storage of contact information in view of the user.

The logical levels may be defined by links between at least a higher level item and at least a lower level item. The items may comprise contact information, or one or more links to other items, or a combination of these.

An advantage of this is a versatile structure, which a user is able to use according to present needs.

The contact information may be arranged to be presented according to said tree structure on a display of said mobile communication apparatus. A display view may comprise all items of said tree structure, wherein said display view may comprise a scrolling function to be able to view a user selected part of said items. The tree structure may be arranged to be presented with relations between items together with images, texts, or symbols, or any combination thereof, related to said items, respectively, and the presented tree structure may be browsable by a user. A group of lower level items linked to an item of a higher logical level may be presented together with said higher logical level item.

An advantage of this is that a user will experience the contact information according to her view of relation between parts of the information, which implies an intuitive structure and an improvement for the user.

The contact information may comprise home telephone number, work telephone number, mobile telephone number, private e-mail address, work e-mail address, home address, work address, image, text, symbol, sound, red-letter day, or web address, or any combination thereof.

According to a second aspect of the present invention, there is provided a method for storing contact information in a mobile communication apparatus comprising: assigning a plurality of logical levels of a tree structure for said contact information; and storing contact information in a logical level of said tree structure being related to said contact information.

An advantage of this is provision of an intuitive structure for the user to store her contact information according to her own experienced relations between contacts.

The logical levels may be associated to groups, families, companies, departments, teams, clubs, or personal relations, or any combination thereof.

According to a third aspect of the present invention, there is provided a method for accessing contact information in a mobile communication apparatus comprising: navigating to a logical level of a tree structure related to said contact information; and accessing said contact information.

An advantage of this is provision of an intuitive structure for the user to access her contact information according to relations between contacts.

The method according the second and third aspects may further comprise presenting said contact information according to said tree structure on a display of said mobile communication apparatus. A display view may comprise all items of said tree structure, wherein the method further may comprise scrolling said display view to view a user selected part of said items.

According to a fourth aspect of the present invention, there is provided a computer program product directly loadable into a memory of a processor, where the computer program product comprises program code for performing the method according to the second aspect of the invention when executed by the processor.

According to a fifth aspect of the present invention, there is provided a computer program product directly loadable into a memory of a processor, where the computer program product comprises program code for performing the method according to the third aspect of the invention when executed by the processor.

According to a sixth aspect of the present invention, there is provided a communication system comprising a communication network being in wireless communication with a plurality of mobile communication apparatuses when in operation, and a memory arranged to hold contact information, wherein items of said contact information are arranged in a tree structure comprising a plurality of logical levels.

The memory may be comprised in one of said mobile communication apparatuses, or in said communication network, or a combination thereof.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
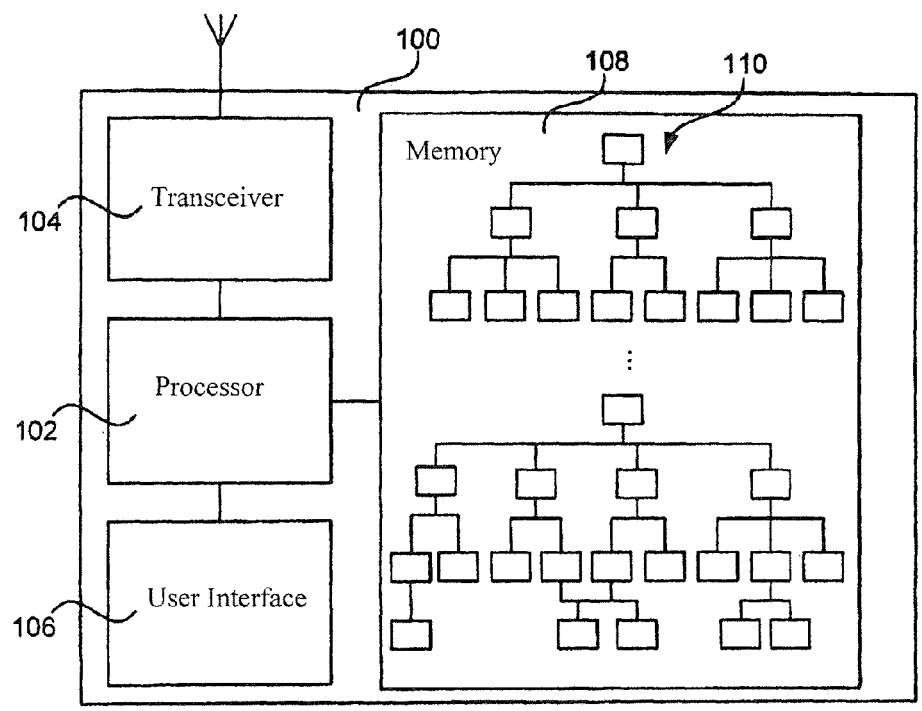
FIG. 1 schematically shows a mobile communication apparatus according to an embodiment of the present invention.

FIG. 1 schematically shows a mobile communication apparatus 100 comprising a processor 102, a transceiver 104 connected to and controlled by the processor 102 and being arranged to wirelessly communicate with a communication network, a user interface 106 connected to and controlled by the processor 102 and being arranged to interact with a user of the mobile communication apparatus 100, and a memory 108 connected to and controlled by the processor 102 and being arranged to comprise contact information 110. For example, the user interface 106 can comprise one or more displays, a keypad, a keyboard, a speaker, a microphone, a touch sensitive input device, a joystick, a rotating input device, or any other user interface means commonly used at mobile communication apparatuses. At least a part of the contact information 110 is arranged in a tree structure comprising a plurality of logical levels, as will be described below. The contact information 110 can comprise one or more groups arranged according to said tree structure. The groups can have different number of logical levels. The tree structure enables the processor 102 to present contact information by the user interface 106 in an improved manner.

Figure 2:
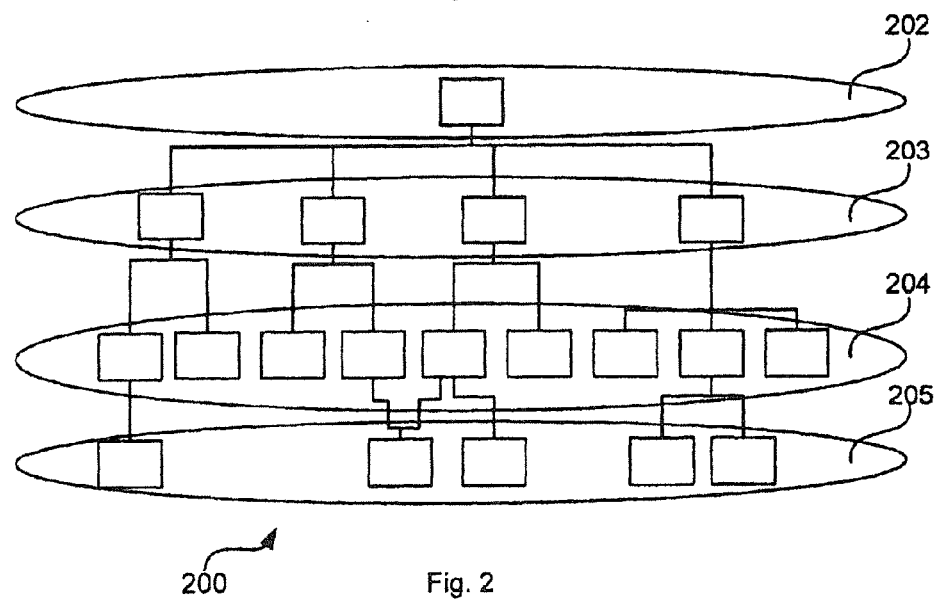
FIG. 2 shows an example of a group of contact information arranged in a tree structure with a plurality of logical levels according to an embodiment of the present invention.

FIG. 2 shows an example of a group 200 of contact information arranged in a tree structure with a plurality of logical levels 202, 203, 204, 205. The contact information is contained in items of the tree structure, where each item can comprise contact information and/or a link to items on a lower logical level. The logical link between the items are assigned by a user, and an item can be assigned logical link from one or more items in a higher logical level. The term higher and lower logical level only denotes which item is linked from another item, and the logical level of an item do not have to be fixed.

Figure 3:
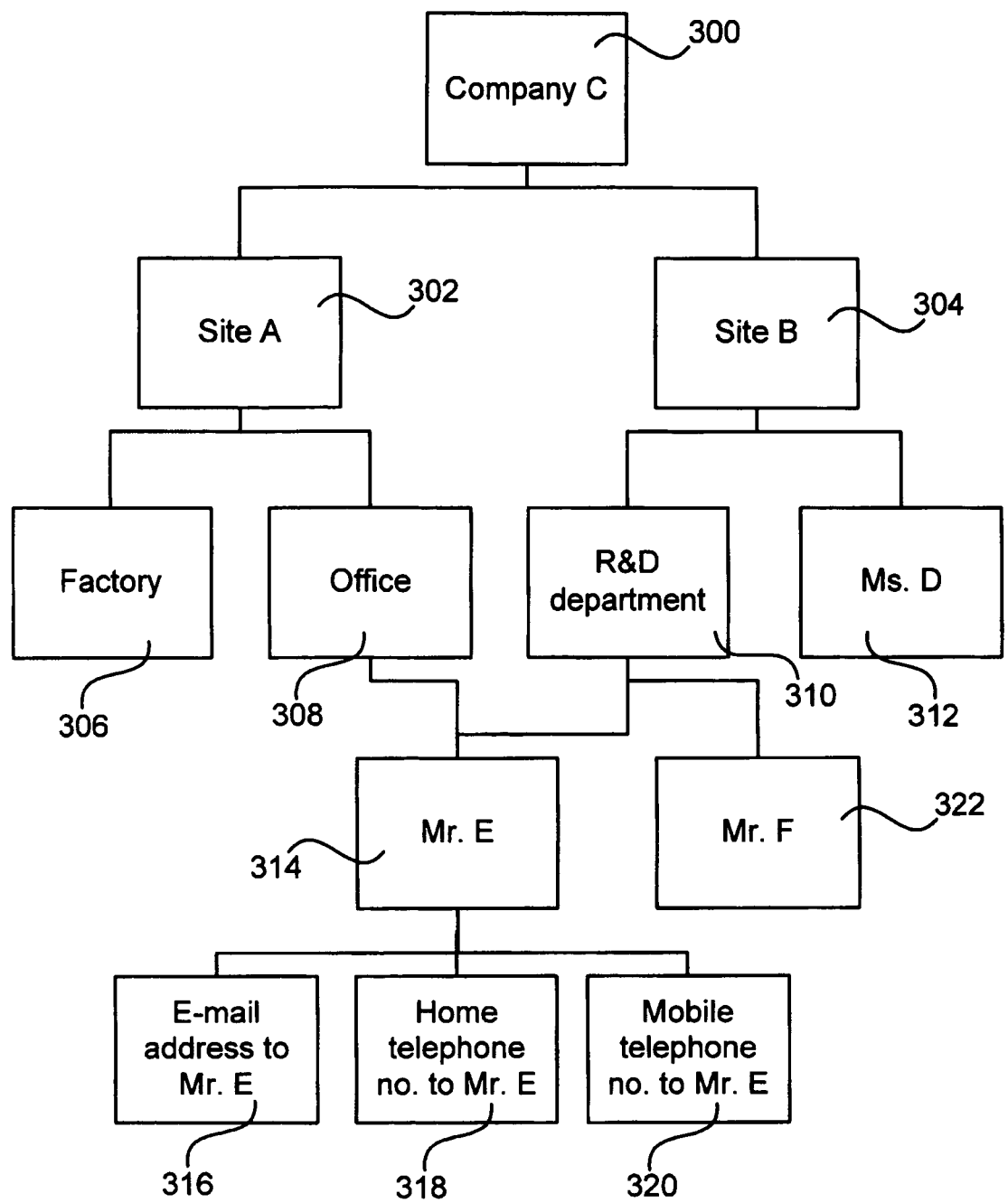
FIG. 3 shows an example how a user can use the tree structure to feasibly arrange her contact information within a group of contact information.

FIG. 3 shows an example how a user can use the tree structure to feasibly arrange her contact information within a group of contact information. The top logical level item 300 can be associated with a company, here called C. The top item 300 can comprise contact information common for the entire company, such as switchboard telephone number, address to head office, web address, etc. This contact information can be comprised in sub-items (not shown) of the top item 300, or directly in the top item 300. Further, the top item 300 comprises links to items 302, 304 on a lower logical level, where the lower level items 302, 304 can be different sites of the company, here item 302 being associated with site A and item 304 being associated with site B. In this example, site A may comprise a factory and an administrative office, which each have an associated contact information item 306, 308 on a further lower logical level. Similarly, site B may comprise an R&D department associated with contact information in an item 310 and being logically linked to the item 304 of site B. Further, contact information about Ms. D, a contact person at site B, is associated with an item 312 which is linked to the item 304 of site B. Contact information about Mr. E, who belongs to the R&D department, but normally is situated at the office at site A, is associated with item 314, which is linked from the site A office item 308 and from R&D department item 310. Items 316, 318, 310, which are linked to contact information item 314 about Mr. E can comprise e-mail address, home telephone number, mobile telephone number, etc. Further contact persons, e.g. Mr. J, can be associated with contact information items, e.g. item 322, linked to higher logical level items, e.g. R&D department item 310, and comprise contact information.

Figure 4:
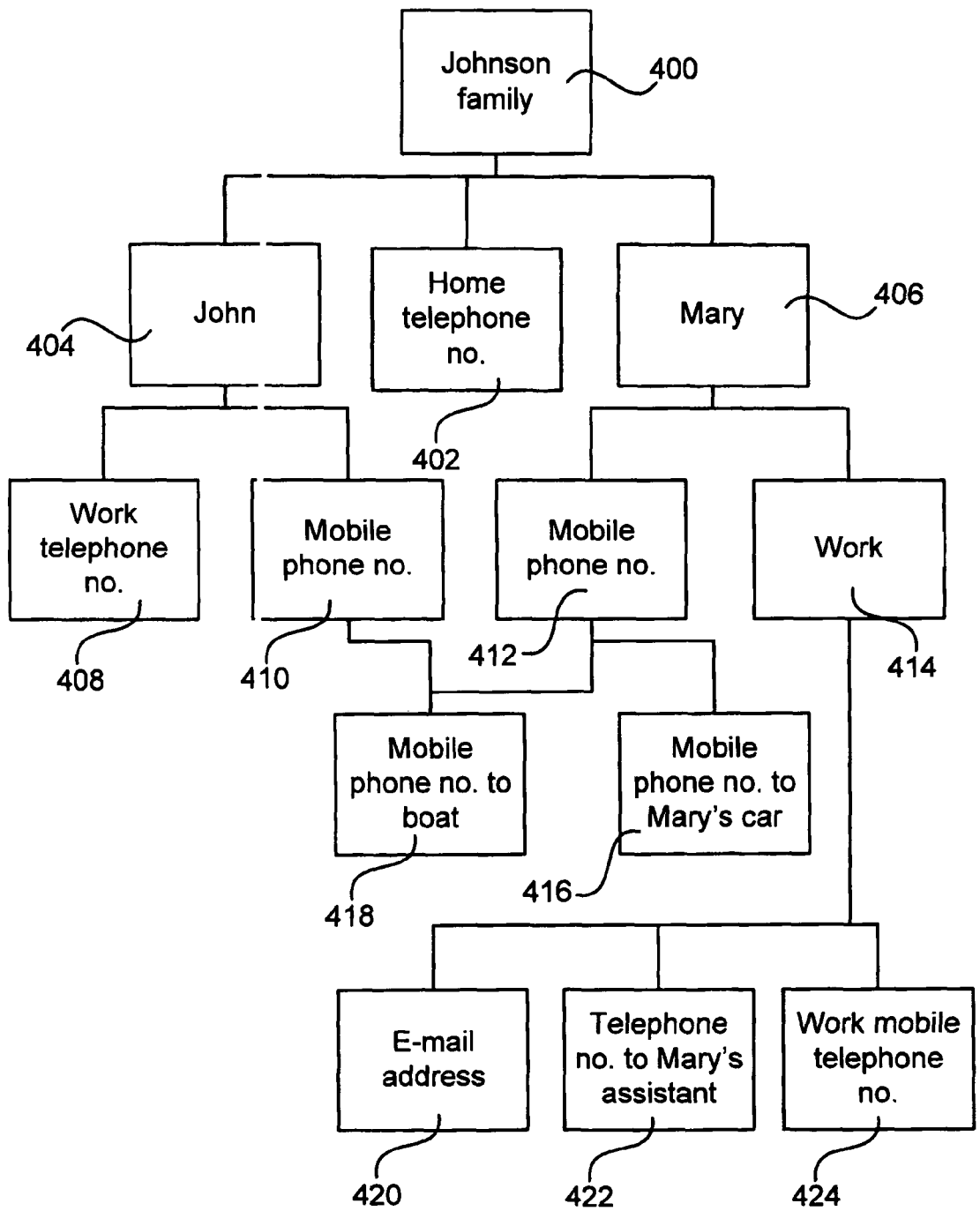
FIG. 4 shows an example how a user can use the tree structure to feasibly arrange her contact information within a group of contact information.

FIG. 4 shows an example how a user can use the tree structure to feasibly arrange her contact information within a group of contact information. The top logical level item 400 can be associated with a family, here called Johnson. The top item 400 can comprise contact information common for the entire family, such as home address, web address, etc. This contact information can be comprised in sub-items, which here is exemplified with home telephone number item 402 linked to the top item 400, of the top item 400, or directly in the top item 400. Further, the top item 400 comprises links to items 404, 406 on a lower logical level, where the lower level items 404, 406 can be different members of the family, here item 404 being associated with John Johnson and item 406 being associated with Mary Johnson. In this example, John may have a work telephone and a mobile telephone, which each have an associated contact information item 408, 410 on a further lower logical level. Similarly, Mary may also have a work telephone and a mobile telephone associated with contact information in items 412, 414 and being logically linked to the item 406 of Mary. Further, contact information about Mary in item 406 can comprise a photo, red-letter days, etc. Mary may have a mobile telephone mounted in her car with a special telephone number, which is comprised in item 416, which is linked to Mary's mobile phone item 412. Mary and John may also have a mobile phone mounted in their boat, and the telephone number to that mobile phone is comprised in item 418, which is linked to both John's and Mary's mobile phone items 410, 412. Mary's e-mail address at work, telephone number to Mary's assistant at work, Mary's mobile telephone number at work, etc can be comprised in items 420, 422, 424, which are linked to Mary's work contact information item 414. This way, it is more feasible for a user to choose the right contact information at any situation for keeping contact with either John or Mary.

It should be noted that an item can be linked more than one group, e.g. as if Mr. J associated with item 322 above happens to be John Johnson associated with item 404 above, then John's contact information items are linked both to the group of company C and the group of the Johnson family.

Any contact information, such as home telephone numbers, work telephone numbers, mobile telephone numbers, private e-mail addresses, work e-mail addresses, home addresses, and/or work addresses, can be structured in this way. Further, images, text, symbols, sounds, red-letter days, and/or web addresses can also be incorporated in this structure for enabling more personalized, informative, and accessible contact information.

As an example the tree structure can be seen as a family album, where the items of each family comprises images, e.g. portraits, which are presented with relations, e.g. husband, wife, kids, brother in law, grandparents, etc, and a user can browse the tree structure on basis of the relations and see the images of the family members. The items can also be represented by symbols, texts, etc, whichever the user finds most convenient. Similarly, the tree structure can be seen as a company roll, where the items of each company comprises images, e.g. portraits, which are presented with relations/roles, e.g. CEO, COO, executive vice president, CTO, manager of department X, CFO, supervisor within Y, legal council, etc, and the user can browse the tree structure on basis of the relations and roles and see e.g. the portraits of the persons. The items can also be represented by symbols, texts, name of department, etc. When the user, during browsing, finds the right person, the item can be selected, and contact information according to what described above can be accessed, or, if the user so prefers, be linked to another tree structure of the selected person, e.g. showing his/her family tree, hunting party, sports association, etc, which can be further browsed in a similar way. Many other examples of tree structure bases, such as different organizations, friendship relations, etc, can be used for organizing contact information.

During browsing, a group of contacts can be selected, e.g. for a group SMS, where the tree structure and its relations are utilized for easily making the group.

Figure 5:
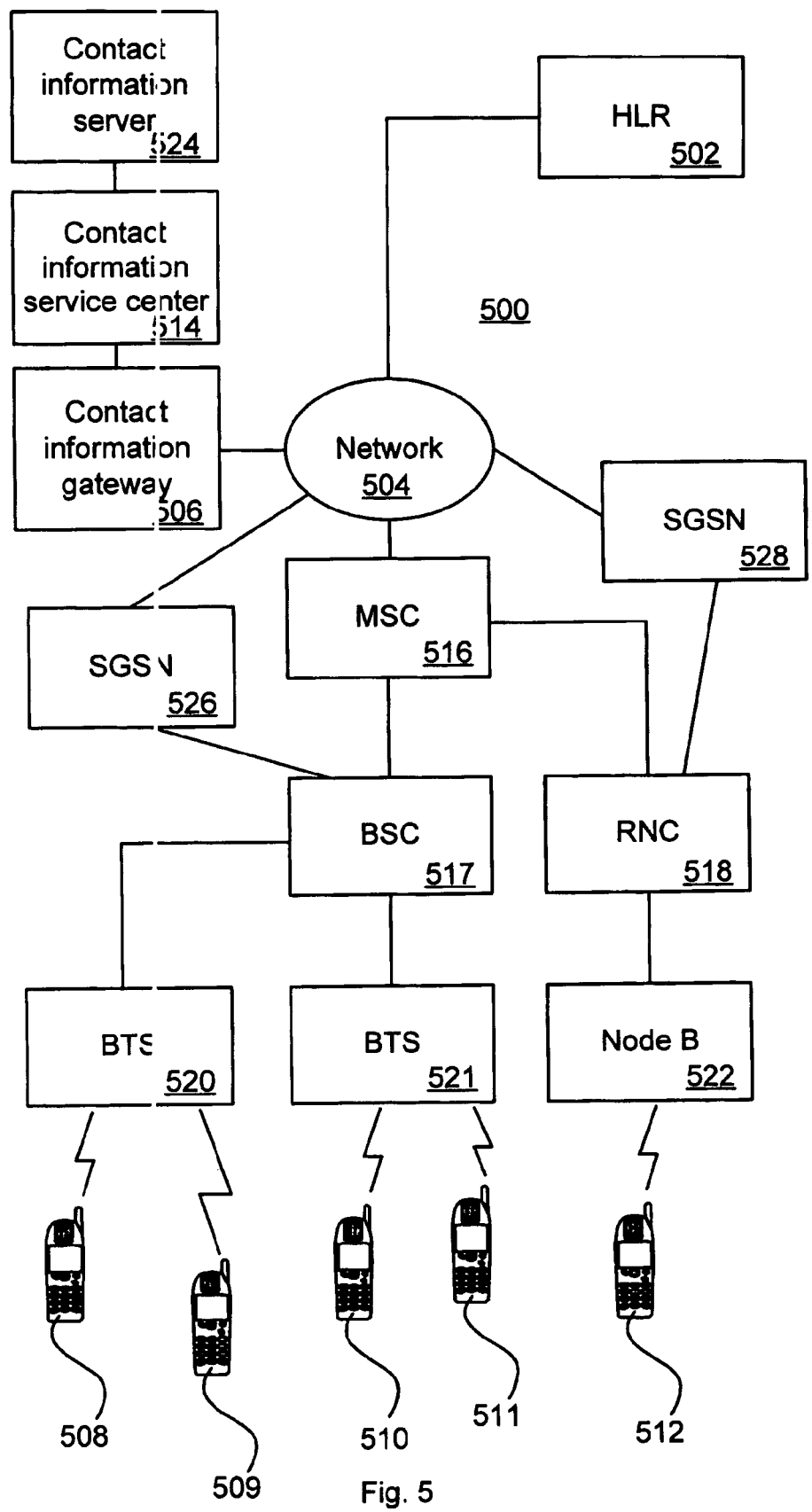
FIG. 5 schematically shows a communication system according to an embodiment of the present invention.

A system architecture for managing a system 500 according to an embodiment of the present invention is shown in FIG. 5. A Home Location Register (HLR) 502 contains a database (not shown) including relevant subscriber information for provision of telecommunication service. A CCITT specified network 504 interconnects the individual parts of the system 500. A contact information gateway 506 is a switching unit routing a message or a call to a mobile communication apparatus 508-512. If contact information is to be stored at network side, a Contact Information Service Center 514 (CINC) and the contact information gateway 506 handles and routes the contact information between the CINC 514 and the network 504. From the network 504, the contact information is routed to the mobile communication apparatuses 508-512 via a Mobile Switching Center (MSC) 516 to a Base Station Controller (BSC) 517 and a Base Transceiver Station (BTS) 520, 521, or a Radio Network Controller (RNC) 518 and a Node B 522. Alternatively, the contact information is routed to the mobile communication apparatuses 508-512 via a Serving GPRS Support Node (SGSN) 526, 528 to the BSC 517 and the BTS 520, 521, or the RNC 518 and the Node B 522, respectively. The BTS 520, 521 or the Node B 522 establish the air connection to the mobile communication apparatuses 508-512.

According to an embodiment of the present invention, a network operator or other third party company handling a contact information server 524 could offer a contact information function between persons not knowing each other. For example a network operator may have a contact information server 524 supporting a feature where the user may send a contact information request from his mobile communication apparatus 508-512 to the contact information server 524 by using a special phone number. This contact information server 524 can then automatically provide contact information structured according to the present invention, e.g. for a company and contact persons at that company, together with web address, fax number, etc.

Figure 6:
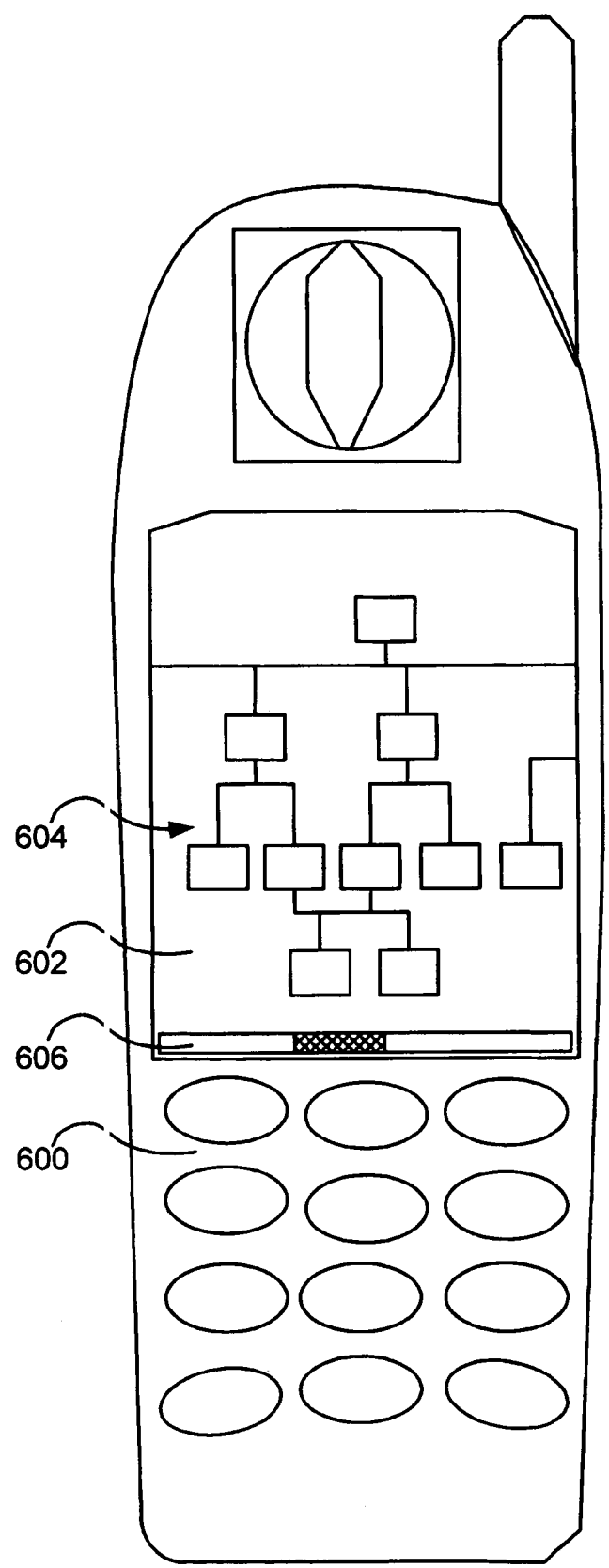
FIG. 6 shows an example according to the present invention, where a mobile communication apparatus views contact information on a display.

FIG. 6 shows an example according to the present invention, where a mobile communication apparatus 600 views contact information on a display 602. The contact information can be presented on the display 602 according to a tree structure 604 on the display 602 of the mobile communication apparatus 600. It can then be feasible to have a display view that comprises all items of the tree structure 604. To be able to see the items in a reasonable size, a scrolling function of the display view can be provided to view a user selected part of the items, where a scroll bar 606 helps a user to navigate the display view. Scrolling can be enabled both horizontally and vertically, depending on the size of the tree structure 604, the size of the display 602, and the preferred sizes of the presented items.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communication apparatus comprising a memory configured to hold contact information, wherein items of said contact information are stored in groups in the memory, each group having a respective tree structure comprising a plurality of logical levels, wherein contact information at a top logical level of a respective group includes contact information that is common to all lower level contact information belonging to the respective group and wherein an item on the top logical level comprises links to items on a lower logical level which comprises links to items on a further lower logical level.

2. The mobile communication apparatus according to claim 1, wherein said logical levels are defined by links between at least a higher level item and at least a lower level item.

3. The mobile communication apparatus according to claim 1, wherein said contact information is configured to be presented according to said tree structure on a display of said mobile communication apparatus.

4. The mobile communication apparatus according to claim 3, wherein a display view comprises all items of said tree structure.

5. The mobile communication apparatus according to claim 4, wherein said display view comprises a scrolling function to be able to view a user selected part of said items.

6. The mobile communication apparatus according to claim 3, wherein said tree structure is configured to be presented with relations between items together with images, texts, or symbols, or any combination thereof, related to said items, respectively, and said presented tree structure is browsable by a user.

7. The mobile communication apparatus according to claim 3, wherein a group of lower level items linked to an item of a higher logical level are presented together with said higher logical level item.

8. The mobile communication apparatus according to claim 1, wherein said contact information comprises home telephone number, work telephone number, mobile telephone number, private e-mail address, work e-mail address, home address, work address, image, text, symbol, sound, red-letter day, or web address, or any combination thereof.

9. A method for storing contact information in a mobile communication apparatus comprising:

assigning a plurality of logical levels of a tree structure to respective groups of said contact information; and storing contact information in a logical level of said tree structure being related to said groups of contact information, wherein contact information at a top logical level of a respective group includes contact information that is common to all lower level contact information belonging to the respective group and wherein an item on the top logical level comprises links to items on a lower logical level which comprises links to items on a further lower logical level.

10. The method according to claim 9, further comprising presenting said contact information according to said tree structure on a display of said mobile communication apparatus.

11. The method according to claim 10, wherein a display view comprises all items of said tree structure.

12. The method according to claim 11, further comprising scrolling said display view to view a user selected part of said items.

13. The method according to claim 9, wherein said contact information comprises home telephone number, work telephone number, mobile telephone number, private e-mail address, work e-mail address, home address, work address, image, text, symbol, sound, red-letter day, or web address, or any combination thereof.

14. The method according to claim 9, wherein said logical levels are associated to groups, families, companies, departments, teams, clubs, or personal relations, or any combination thereof.

15. A method for accessing contact information in a mobile communication apparatus comprising:

navigating to a logical level of a tree structure related to a respective group of said contact information, wherein contact information at a top logical level of the respective group includes contact information that is common to all lower level contact information belonging to the respective group and wherein an item on the top logical level comprises links to items on a lower logical level which comprises links to items on a further lower logical level; and accessing said contact information.

16. The method according to claim 15, further comprising presenting said contact information according to said tree structure on a display of said mobile communication apparatus.

17. The method according to claim 16, wherein a display view comprises all items of said tree structure.

18. The method according to claim 17, further comprising scrolling said display view to view a user selected part of said items.

19. The method according to claim 15, wherein said contact information comprises home telephone number, work telephone number, mobile telephone number, private e-mail address, work e-mail address, home address, work address, image, text, symbol, sound, red-letter day, or web address, or any combination thereof.

20. The method according to claim 15, wherein said logical levels are associated to groups, families, companies, departments, teams, clubs, or personal relations, or any combination thereof.

21. A non-transitory computer readable medium comprising:

computer readable program code for causing a computer to perform the method as defined in claim 9.

22. A non-transitory computer readable medium comprising: comprising:

computer readable program code for causing a computer to perform the method as defined in claim 15.

23. A user interface comprising:

a display; and a processing unit configured to present, on the display, items regarding contact information where the items are arranged in groups, each group having a tree structure comprising a plurality of logical levels, wherein contact information at a top logical level of a respective group includes contact information that is common to all lower level contact information belonging to the respective group and wherein an item on the top logical level comprises links to items on a lower logical level which comprises links to items on a further lower logical level.

24. The user interface of claim 23, wherein the processing unit is further configured to present all items of the tree structure on the display.

25. The user interface of claim 23, further comprising at least one scroll bar where the processing unit is further configured to present a portion of the tree structure on the display, the scroll bar being configured to allow horizontal and/or vertical scrolling of the tree structure on the display.

* * * * *

UNITED STATES PATENT AND TRADEMARK OFFICE
CERTIFICATE OF CORRECTION

| | | |
|---|---|---|
| PATENT NO. | : 8,559,928 B2 | Page 1 of 1 |
| APPLICATION NO. | : 11/170730 | |
| DATED | : October 15, 2013 | |
| INVENTOR(S) | : Kraft et al. | |

It is certified that error appears in the above-identified patent and that said Letters Patent is hereby corrected as shown below:

In the claims:

<u>Claim 22, Column 8,</u>
Line 21, cancel second occurrence of "comprising:".

Signed and Sealed this
Eleventh Day of March, 2014

Michelle K. Lee
*Deputy Director of the United States Patent and Trademark Office*